Nov. 5, 1974 D. KÜHL 3,846,176
FUEL CELL ENCASED IN MOLDED PLASTIC MATERIAL
Filed Jan. 19, 1970
2 Sheets-Sheet 1

United States Patent Office 3,846,176
Patented Nov. 5, 1974

3,846,176
FUEL CELL ENCASED IN MOLDED
PLASTIC MATERIAL
Dieter Kühl, Bubenreuth, Germany, assignor to Siemens
Aktiengesellschaft, Berlin and Munich, Germany
Filed Jan. 19, 1970, Ser. No. 3,794
Claims priority, application Germany, Jan. 18, 1969,
P 19 02 392.8
Int. Cl. H01m 27/00, 27/02
U.S. Cl. 136—86 R          12 Claims

ABSTRACT OF THE DISCLOSURE

Method of producing fuel cell encased in molded plastic material and composed of a substantially planar support frame defining a chamber for receiving liquid electrolyte and, superposed on each side of the support frame, a substantially planar diaphragm member and a substantially planar cover plate member sandwiching therebetween a substantially planar electrode and a substantially planar spacer defining a chamber for receiving reactant gas includes cementing the edges of each of the diaphragm members to another of the members with a bonding agent, and sealing at least one of the chambers with additional bonding agent prior to molding a casing of plastic material about the superposed components, and fuel cell produced thereby.

My invention relates to method of producing fuel cells encased in molded plastic material and fuel cell produced thereby.

It has already been proposed that gas-diffusion electrodes operating on both sides thereof in fuel cells be combined into a battery by means of plastic materials. This has been effected for example by stacking positive and negative electrodes i.e. anodes and cathodes, in alternating sequence on top of one another and forming a casting of molding resin about the same in a mold, spacer frames being inserted between the electrodes so as to form a space for subsequently receiving electrolyte therein while preventing penetration of the molding resin into the thus-formed electrolyte space, the spacer frames being removed after hardening of the molding resin. In this known process, prior to applying the molding resin, supply or connecting channels for the electrolyte or reaction gas were formed for example by placing on or within the stack of electrodes, mold members formed of materials such as polyvinyl alcohol, which are not wetted by the molding resin, and these mold members are dissolved or melted out after hardening of the resin.

It is accordingly an object of my invention to provide method of producing a fuel cell encased in molded plastic material and composed of a substantially planar support frame refining a chamber for receiving liquid electrolyte and, superposed on each side of the support frame, a substantially planar diaphragm member and a substantially planar cover plate member sandwiching therebetween a substantially planar electrode and a substantially planar spacer defining a chamber for receiving reactant gas wherein, after subsequent hardening of the molded plastic material encasing the superposed components, it is no longer necessary to dissolve or melt out any material necessary for closing the electrolyte or reactant gas chambers or for forming connecting channels.

With the foregoing and other objects in view I provide, in accordance with my invention, method of producing fuel cell enclosed in molded plastic material and composed of a substantially planar support frame defining a chamber for receiving liquid electrolyte and, superposed on each side of the support frame, a substantially planar diaphragm member and a substantially planar cover plate member sandwiching therebetween a substantially planar electrode and a substantially planar spacer defining a chamber for receiving reactant gas, which comprises cementing the edges of each of the diaphragm members to another of the members with a bonding agent, and sealing at least one of the chambers with additional bonding agent prior to molding a casing of plastic material about the superposed components.

Further in accordance with my invention, I provide fuel cell produced according to the foregoing method comprising a substantially planar support frame defining a chamber for receiving liquid electrolyte and, superposed on each side of the support frame, a substantially planar diaphragm member and a substantially planar cover plate member sandwiching therebetween a substantially planar electrode and a substantially planar spacer defining a chamber for receiving reactant gas, a bonding agent cementing the edges of each of the diaphragm members to another of the members and sealing at least one of the chambers, and a casing of molded plastic material surrounding the superposed components.

Other features which are considered as characteristic for the invention are set forth in the appended claims.

Although the invention is illustrated and described herein as method of producing fuel cells encased in molded plastic material and fuel cell produced thereby, it is nevertheless not intended to be limited to the details shown, since various modifications may be made therein without departing from the spirit of the invention and within the scope and range of equivalents of the claims.

The invention, however, together with additional objects and advantages thereof will be best understood from the following description when read in connection with the accompanying drawings, in which.

Figure 1:
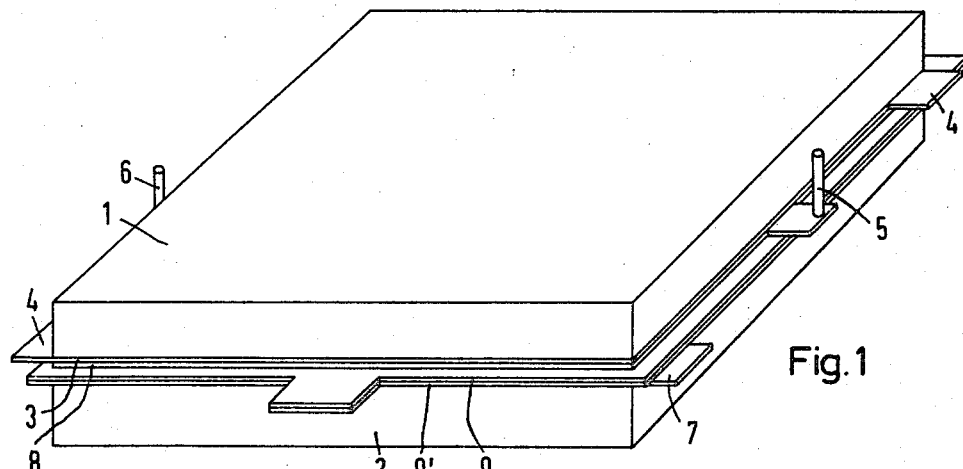
FIG. 1 is a perspective view of a fuel element constructed in accordance with the method of my invention.
Figure 1A:
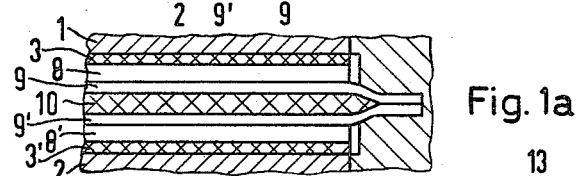
FIG. 1a is a fragmentary sectional view of FIG. 1 taken along the line Ia—Ia in the direction of the arrows.

Referring now to the drawings, and first particularly to FIGS. 1 and 1a thereof, there is shown a fuel cell constructed in accordance with my invention having square end plates or divider plates 1 and 2 formed of an epoxide resin. In a particular embodiment of the fuel cell, the length of each side of the square cover or end plates 1 and 2 is 100 mm., and the plates are about 10 mm. thick. At the inner surface of the cover plate 1, a spacer screen 3 of polypropylene having a mesh size of about 0.3 mm. is disposed and forms a gas chamber for the fuel cell, and two fins 4 are disposed at opposite diagonal corners of the plate 1 for supplying and discharging gaseous reactants to the fuel cell. At the inner surface of the cover plate 2, a spacer screen 3' similar to the spacer screen 3 is located and forms a gas chamber for the fuel cell and two fins 7 (only one shown in FIG. 1) are disposed at corners of the plate 2 located at opposite ends of a diagonal thereof which extends transversely to the diagonal of plate 1 at the ends of which the fins 4 are located. Pulverulent electrodes 8, 8' are disposed on the opposite sides, respectively, of the spacer screens 3, 3' from the cover plates 1, 2, the pulverulent particles being bound to one another by a suitable binder material. Such binder materials are known from Pat. No. 3,480,538 of F. V. Sturm and may consist for example of polytetrafluoroethylene, methyl methacrylate or polyethylene powders or powdered glass.

In the illustrated embodiment, the anode 8 is formed of Raney-nickel and has the dimensions 100 mm. x 100 mm. x 1.2 mm. The cathode 8' is formed of pulverulent Raney-silver bonded by the binding medium, and has the dimension 100 mm. x 100 mm. x 0.7 mm. Contact fins provided with sockets or terminals 5 and 6, respectively, for withdrawing current from the fuel cell extend from the anode 8 and the cathode 8', respectively. Between the electrodes 8 and 8' there is disposed a support frame 10 formed of nickel screen having the dimensions 100 mm. x 100 mm. x 0.6 mm. and a mesh size of 0.6 mm. on which a fine-mesh nickel screen having a mesh size of 0.15 mm. is spot-welded at both sides thereof. The thickness of the fine-mesh nickel screen is 0.15 mm. Each of the nickel screens is provided with two fins located, respectively, in the middle of a pair of opposite edges thereof and serving for supplying and discharging electrolyte therefrom. The support frame is completely enclosed by and between a pair of diaphragms 9 and 9' formed of asbestos sheets. The measurements of the diaphragms are 106 mm. x 106 mm. x 0.4 mm.

According to the method of my invention, the edges of both diaphragms 9 and 9' are cemented to one another so as to form thereby an electrolyte chamber containing the support frame 10 and closed to the exterior. A bonding agent suitable for cementing the diaphragms 9 and 9' to one another can consist of any plastic material which is resistant to the corrosive action of liquid electrolyte such as for example epoxide resin and polyurethane, for example. As a matter of expedience, the bonding agent can consist of the same material as the molding resin subsequently employed for encasing the fuel cell.

The bonding agent can be hardened or set under pressure and heat, and the time necessary for effecting the setting of the bonding agent is dependent upon the kind of bonding agent employed. In an example of the method of the invention in the instant application, the bonding agent consisted of epoxide resin, and setting or hardening thereof was effected within about 2.5 hours at 60° C.

The support frame 10 enclosed between the diaphragms 9 and 9', the electrodes 8 and 8', the spacer screens 3 and 3' and the cover or end plates 1 and 2 are stacked on top of one another and are pressed together by means of a suitable compression device. The fins 4 and 7 are covered with pockets formed of asbestos paper, and the reaction gas chambers defined by the spacer screen members 3 and 3' and which are still exposed, are sealed with the aid of a spray gun with a suitable bonding agent such as for example a mixture of 5 parts asbestos flour, 3 parts epoxide resin and 60 parts acetone, all by weight. The sealing bonding agent not only seals the gas chambers defined by the spacers 3 and 3' but also simultaneously forms crossing layers between the diaphragms and electrodes, on the one hand, and the subsequently applied molding resin, on the other hand, these crossing layers serving to prevent penetration of the molding resin into the electrodes. Furthermore, the crossing layers formed between the molding resin and the electrodes are in a position for compensating thermally induced differences in expansion.

The active surfaces of the electrodes 8 and 8' are not reduced by the spraying of the bonding agent mixture, because the latter does not penetrate into the electrodes to any appreciable extent. Obviously, the sealing of the electrolyte chamber defined by the support frame 10 can be effected by other methods, for example by thickening the bonding agent with a filler and applying it with a spatula. All non-conductive pulverulent materials resistant to the electrolyte can be used as the filler, such as hardened pulverulent epoxide resin, for example.

After the sprayed-on bonding agent has set or hardened, the stacked or superposed substantially planar components of the fuel cell are placed in a mold and encased in subsequently hardened molded epoxide resin in a conventional manner. Thereafter, all of the fins are bored to provide supply and discharge channels for electrolyte and reactant gases, respectively, and the fuel cell can be immediately placed in operation after electrolyte and reactants have been supplied thereto.

Figure 2:
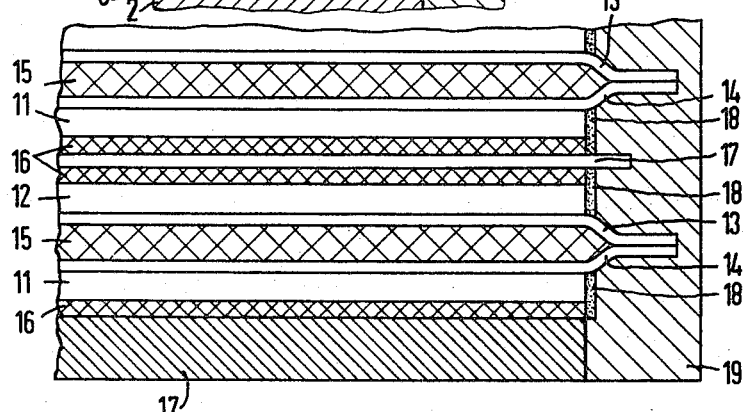
FIG. 2 is a cross sectional view similar to that of FIG. 1a of a battery of fuel cells constructed in accordance with the invention.

Obviously, the method invention of this application is not limited to encasing a single fuel element in molded plastic material such as the embodiment shown in FIGS. 1 and 1a, but can in a similar manner be employed for encasing a stack of fuel elements in molded plastic material so as to form a battery block such as is diagrammatically illustrated in the sectional view of FIG. 2.

In the embodiment of FIG. 2 there are provided for each of the fuel cells in the battery block, an anode 11 and a cathode 12 as well as a support frame 15 enclosed by diaphragms 13 and 14 which are cemented by bonding agent along the edges thereof. Respective spacer screens 16 for each of the fuel cells are located adjacent respective cover plates which, in the embodiment of FIG. 2, include an end plate 17 and a divider plate or partition 17'. Bonding agent 18 containing a filler, if desired, is sprayed onto the edges of the electrodes 11 and 12 and the spacer screens 16, and molding resin 19 is molded about the stacked components of the fuel cell.

Figure 3:
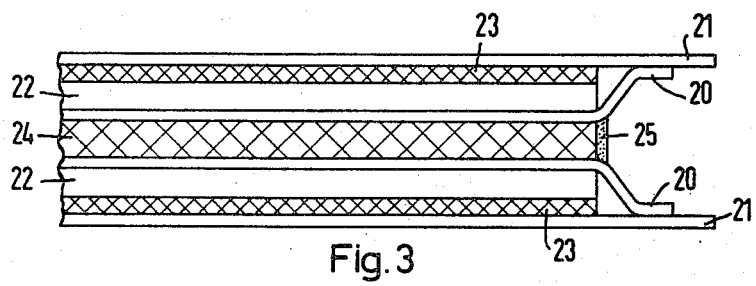
FIG. 3 is a sectional view similar to that of FIG. 1a of another embodiment of fuel cell.

In accordance with a further embodiment of the fuel cell of my invention as shown in FIG. 3, the diaphragm 20 are respectively cemented along the edges thereof by the bonding agent to respective end or divider plates 21 for enclosing the reaction gas chambers defined by the spacer screens 23. The space enclosed by the respective mutually bonded diaphragm 20 and plate 21 contains an electrode 22 and spacer screen 23. The electrolyte chamber defined by the support frame 24 and covered on both sides thereof by the diaphragms 20 is sealed by a layer of bonding agent 25 in a manner analogous to the sealing of the reactant gas chambers defined by the spacer screens 3 and 3' in FIG. 1a.

It is, of course, readily apparent that the embodiment of FIG. 3 can be suitably encased both as a single fuel cell in molded plastic material like the embodiments of FIGS. 1 and 1a, as well as in a stack with other fuel of similar construction to form a battery block in the manner of the embodiment of FIG. 2.

In the production of fuel cell batteries it is also advantageous, in many cases, to install electrodes that are active or operate at both sides thereof instead of only at one side thereof. Such construction is diagrammatically illustrated in the sectional view of FIG. 4 wherein reaction gas chambers defined by the spacers 27 are sealed by cementing the edges of diaphragms 26 together with one of the aforementioned bonding agents. Within the spaces enclosed by the mutually bonded diaphragms 26 there are located at least one spacer screen 27 and two anodes 28, on the one hand, and two cathodes 29, on the other hand.

Figure 4:
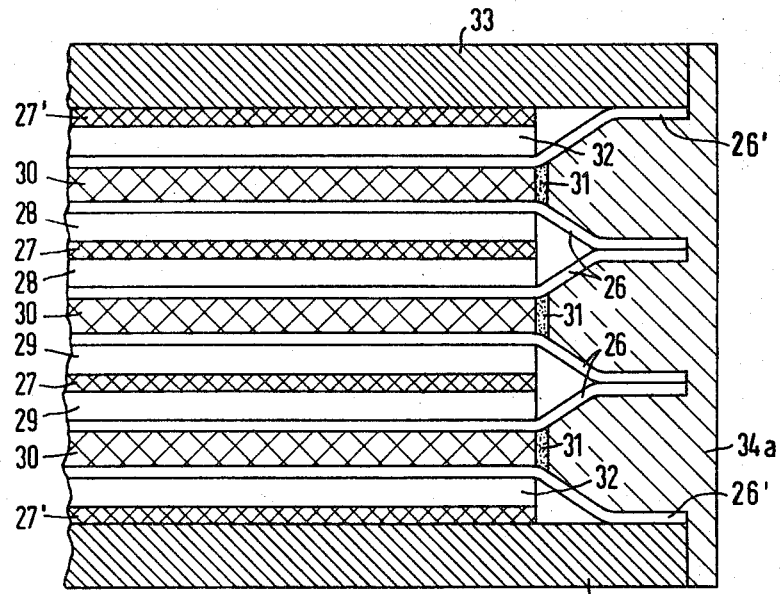
FIG. 4 is a sectional view similar to that of FIG. 2 of another embodiment of the fuel cell battery.

The electrolyte chamber defined by each of the support frames 30 in the embodiment of FIG. 4 is sealed between respective pairs of diaphragms 26 by a layer of bonding agent 31. The end-most electrodes 32 are active or operate at only one side thereof and are enclosed with respective reactant gas chambers defined by spacer screens 27' between respective end cover plates 33 and diaphragms 26' cemented thereto by the aforementioned bonding agent. After stacking the fuel cell components into a battery, the package is encased in molded plastic material 34a.

In a manner analogous to that for the embodiment of FIG. 2, the electrolyte chambers defined by the support frames 30 in the embodiment of FIG. 4 can be closed by cementing together the edges of the diaphragms 26 located immediately adjacent the respective support frames 30, and the reaction gas chambers defined by the spacers 27 and 27' can be sealed by suitably spraying or applying by spatula a layer of bonding agent across the edges thereof and of the electrode or electrodes located adjacent thereto.

Figure 5:
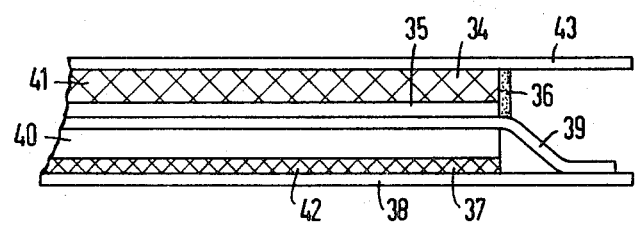
FIG. 5 is another view similar to that of FIG. 3 of a further embodiment of the fuel cell of my invention.

In the diagrammatic sectional view of FIG. 5 there is shown that the method of my invention can also be employed for producing fuel cells and batteries made up from a plurality of such fuel cells wherein each cell is provided with only a single spacer screen 37 defining a reactant gas chamber for gaseous oxidant while the reactant fuel is dissolved in the electrolyte received in the electrolyte chamber 34 defined by the support frame 41. The electrolyte chamber 34 and the electrode 35 are sealed by a layer of one of the aforementioned bonding agents 36 extending between the diaphragm 39 and a divider or end plate 43, and the gaseous oxidant chamber 37 in the spacer 42 as well as the cathode 40 are enclosed by cementing the edges of the diaphragm 39 to the divider or end plate 38 with the bonding agent.

The novel method of my invention is distinguished primarily by the fact that it is relatively simple to practice, and costly after-treatments of the molded fuel cell or battery are dispensed with. Thus, it is no longer necessary, as it had been with the heretofore known methods of this general type, to dissolve or melt out the material employed heretofore for sealing purposes. As a result of the elimination of after-treatment, impairment of catalysts due to melting thereof by solvents or due to heating thereof cannot occur. Furthermore, even a slight amount of sealing material that might otherwise accidentally remain in the fuel cell subsequent to the after-treatment cannot be present in the fuel cell according to my invention, so that no possible clogging of the electrodes thereby or the reaction thereof with the reactants or catalysts can occur.

What is claimed is:

1. Fuel cell comprising a substantially planar support frame forming a chamber for receiving liquid electrolyte therein and, superposed on each side of said support frame, a substantially planar diaphragm member, a substantially planar electrode, a substantially planar cover plate member, and a substantially planar spacer sandwiched between and completely covered by one of said diaphragm members and said cover plate member, said substantially planar spacer having voids therein thereby forming with said electrode and cover plate a chamber for receiving reactant gas therein, said diaphragm member having edges extending beyond the edges of the electrode and the spacer, a bonding agent cementing the edges of each of said diaphragm members to each other so as to enclose at least one of the chambers therewithin, a layer of additional bonding agent disposed across the edges of at least one of the other of said chambers for sealing the same, and a casing of molded plastic material surrounding the superposed components.

2. Fuel cell comprising a pair of spaced substantially planar cover plates sandwiching therebetween successive substantially planar components comprising a support frame forming an electrolyte chamber, a first electrode, a diaphragm member, a second electrode and a spacer forming a reactant chamber, and including a bonding agent cementing the edges of said diaphragm member to one of said cover plates so as to enclose one of said chambers between said mutually cemented diaphragm member and said one cover plate, a sealing layer of additional bonding agent disposed over the edges of the other of said chambers and between the other cover plate and the diaphragm member, and a casing of molded plastic material surrounding the sandwiched components.

3. Fuel cell according to claim 2, wherein the edges of said diaphragm are cemented to the cover plate located adjacent said spacer so as to enclose said reactant chamber between said mutually cemented diaphragm member and the cover plate adjacent said spacer, and said layer of additional bonding agent seals said electrolyte chamber.

4. Fuel cell according to claim 1, including fins formed on said support frame in said electrolyte chamber for supplying to and discharging from said electrolyte chamber the liquid electrolyte.

5. Fuel cell according to calim 1, including fins formed on said spacer in said reactant gas chamber for supplying to and discharging from said reactant gas chamber the reactant gas.

6. Fuel cell according to claim 1, including fins formed on said support frame in said electrolyte chamber and on said spacers in said reactant gas chambers for supplying thereto and discharging therefrom the liquid electrolyte and the reactant gas, respectively, said fins being covered with pockets formed of asbestos paper.

7. Fuel cell according to claim 1, including fins formed on said support frame in said electrolyte chamber and on said spacers in said reactant gas chambers for supplying thereto and discharging therefrom the liquid electrolyte and the reactant gas, respectively, said fins being formed with bores.

8. Fuel cell comprising a substantially planar support frame forming a chamber for receiving liquid electrolyte therein and, superposed on each side of said support frame, a substantially planar diaphragm member, a substantially planar electrode, a substantially planar cover plate member, and a substantially planar spacer sandwiched between and completely covered by one of said diaphragm members and said cover plate member, said substantially planar spacer having voids therein thereby forming with said electrode and said cover plate member a chamber for receiving reactant gas therein, said diaphragm member having edges extending beyond the edges of the electrode and the spacer, a bonding agent cementing the edges of each of said diaphragm members to the respective cover plate member so as to enclose at least one of the chambers therewithin, a layer of additional bonding agent disposed across the edges of at least one of the other of said chambers for sealing the same, and a casing of molded plastic material surrounding the superposed components.

9. Fuel cell according to claim 8, including fins formed on said support frame in said electrolyte chamber for supplying to and discharging from said electrolyte chamber the liquid electrolyte.

10. Fuel cell according to claim 8, including fins formed on said spacer in said reactant gas chamber for supplying to and discharging from said reactant gas chamber the reactant gas.

11. Fuel cell according to claim 8, including fins formed on said support frame in said electrolyte chamber and on said spacers in said reactant gas chambers for supplying thereto and discharging therefrom the liquid electrolyte and the reactant gas, respectively, said fins being covered with pockets formed of asbestos paper.

12. Fuel cell according to claim 8, including fins formed on said support frame in said electrolyte chamber and on said spacers in said reactant gas chambers for supplying thereto and discharging therefrom the liquid electrolyte and the reactant gas, respectively, said fins being formed with bores.

References Cited

UNITED STATES PATENTS

| | | | |
|---|---|---|---|
| 2,928,783 | 3/1960 | Bacon | 136—86 X |
| 3,126,302 | 3/1964 | Drushella | 136—86 |
| 3,143,440 | 8/1964 | Hunger et al. | 136—86 |

ALLEN B. CURTIS, Primary Examiner

H. A. FEELEY, Assistant Examiner